United States Patent
Karaoguz et al.

(10) Patent No.: US 8,150,945 B2
(45) Date of Patent: Apr. 3, 2012

(54) HOST ARBITRATED USER INTERFACE RESOURCE SHARING

(75) Inventors: Jeyhan Karaoguz, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 907 days.

(21) Appl. No.: 10/874,426

(22) Filed: Jun. 23, 2004

(65) Prior Publication Data

US 2005/0065768 A1 Mar. 24, 2005

Related U.S. Application Data

(60) Provisional application No. 60/504,905, filed on Sep. 22, 2003.

(51) Int. Cl.
*G06F 15/177* (2006.01)

(52) U.S. Cl. ........ 709/220; 709/222; 455/419; 455/420; 710/10

(58) Field of Classification Search .................. 709/226, 709/220, 222; 370/331; 455/435.3, 442, 455/419, 420; 710/10
See application file for complete search history.

(56) References Cited

U.S. PATENT DOCUMENTS

| | | | | |
|---|---|---|---|---|
| 5,388,101 A * | 2/1995 | Dinkins | ........................ | 725/62 |
| 5,694,150 A * | 12/1997 | Sigona et al. | ................. | 715/856 |
| 5,696,903 A * | 12/1997 | Mahany | ....................... | 709/228 |
| 5,864,738 A * | 1/1999 | Kessler et al. | ................. | 709/239 |
| 6,223,029 B1 * | 4/2001 | Stenman et al. | ............. | 455/420 |
| 6,233,448 B1 * | 5/2001 | Alperovich et al. | .......... | 455/417 |
| 6,701,357 B1 * | 3/2004 | Astarabadi et al. | .......... | 709/220 |
| 6,708,030 B1 * | 3/2004 | Horikawa | ...................... | 455/436 |
| 6,708,228 B1 * | 3/2004 | Meyers et al. | .................... | 710/5 |
| 6,748,195 B1 * | 6/2004 | Phillips | ........................ | 455/41.2 |
| 6,748,215 B1 * | 6/2004 | Chen et al. | ..................... | 455/434 |
| 6,850,503 B2 * | 2/2005 | Dorenbosch et al. | ......... | 370/331 |
| 7,103,359 B1 * | 9/2006 | Heinonen et al. | ............. | 455/436 |
| 7,209,946 B2 * | 4/2007 | Dowling | ....................... | 709/203 |
| 7,965,684 B2 * | 6/2011 | Gauthier et al. | .............. | 370/331 |
| 2001/0054060 A1 * | 12/2001 | Fillebrown et al. | ........... | 709/201 |
| 2002/0044131 A1 * | 4/2002 | Benayoun et al. | ............ | 345/156 |
| 2002/0052182 A1 * | 5/2002 | Mayuzumi | ...................... | 455/41 |
| 2002/0091850 A1 * | 7/2002 | Perholtz et al. | ............... | 709/231 |
| 2002/0128041 A1 * | 9/2002 | Parry | ............................ | 455/560 |
| 2003/0001820 A1 * | 1/2003 | Hou | .............................. | 345/168 |
| 2003/0036386 A1 * | 2/2003 | Harrison | ...................... | 455/438 |
| 2003/0039356 A1 * | 2/2003 | Kurashima et al. | ............ | 380/42 |
| 2003/0060218 A1 * | 3/2003 | Billerbeck et al. | ............ | 455/501 |
| 2003/0073434 A1 * | 4/2003 | Shostak | ........................ | 455/426 |

(Continued)

*Primary Examiner* — Patrice Winder
*Assistant Examiner* — Tauqir Hussain
(74) *Attorney, Agent, or Firm* — Brinks Hofer Gilson & Lione

(57) ABSTRACT

A system and method for managing a user interface resource. Various aspects of the present invention comprise establishing a wireless communication link between a user interface resource and a first system. The user interface resource may, for example, be utilized to communicate user interface information with the first system. An inter-system communication link may be established between the first system and a second system. The user interface resource, or alternative source, may communicate a predetermined signal to the first system. The first system may, for example after receiving the predetermined signal, communicate a hand-off signal to the second system over the inter-system communication link. The hand-off signal may indicate that the user interface resource is to be used with the second system. The second system may establish a wireless communication link with the user interface resource, and the user interface resource may be utilized with the second system.

33 Claims, 6 Drawing Sheets

U.S. PATENT DOCUMENTS

| | | | |
|---|---|---|---|
| 2003/0092437 A1* | 5/2003 | Nowlin et al. | 455/420 |
| 2003/0171147 A1* | 9/2003 | Sinclair et al. | 463/39 |
| 2003/0179731 A1* | 9/2003 | Noguchi et al. | 370/331 |
| 2004/0003311 A1* | 1/2004 | Jones | 713/320 |
| 2004/0067737 A1* | 4/2004 | Kuo | 455/90.3 |
| 2004/0142693 A1* | 7/2004 | Feder et al. | 455/443 |
| 2004/0161111 A1* | 8/2004 | Sherman | 380/283 |
| 2004/0172658 A1* | 9/2004 | Rakib et al. | 725/120 |
| 2004/0193675 A1* | 9/2004 | Fillebrown et al. | 709/203 |
| 2004/0203618 A1* | 10/2004 | Lau et al. | 455/412.1 |
| 2005/0027841 A1* | 2/2005 | Rolfe | 709/223 |
| 2005/0037818 A1* | 2/2005 | Seshadri et al. | 455/569.1 |
| 2005/0041621 A1* | 2/2005 | Gauthier et al. | 370/331 |
| 2005/0120079 A1* | 6/2005 | Anderson et al. | 709/203 |
| 2005/0136958 A1* | 6/2005 | Seshadri et al. | 455/519 |
| 2006/0025135 A1* | 2/2006 | Karaoguz et al. | 455/436 |
| 2007/0022058 A1* | 1/2007 | Labrou et al. | 705/67 |
| 2008/0016558 A1* | 1/2008 | Aull et al. | 726/9 |
| 2008/0158021 A1* | 7/2008 | Sheehan et al. | 341/22 |

* cited by examiner

HOST ARBITRATED USER INTERFACE RESOURCE SHARING

CROSS-REFERENCE TO RELATED APPLICATIONS/INCORPORATION BY REFERENCE

This patent application is related to and claims priority from provisional patent application Ser. No. 60/504,905 filed Sep. 22, 2003, and titled "HOST ARBITRATED USER INTERFACE RESOURCE SHARING," the contents of which are hereby incorporated herein by reference in their entirety. This patent application is related to U.S. patent application Ser. No. 10/874,430, filed Jun. 23, 2004, and titled "CENTRAL SYSTEM BASED USER INTERFACE RESOURCE MANAGEMENT"; and U.S. patent application Ser. No. 10/874,506, filed Jun. 23, 2004, and titled "RESOURCE CONTROLLED USER INTERFACE RESOURCE MANAGEMENT".

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In a dynamic network environment, for example a wireless communication network, where resources may serve and be served by a dynamically changing group of other resources, the environment should include a system and method for managing user interface resources.

Present systems to not provide a user friendly and efficient mechanism for managing user interface resources in a dynamic network environment. Present systems may be deficient in a variety of ways. For example and without limitation, a user may be required to perform an inconvenient array of set-up procedures to utilize a particular user interface resource with a particular system. Such set-up procedures may include, for example, physically altering system connections and/or manually specifying communication link parameters. The user may, for example, have to perform such set-up procedures on numerous systems.

Also for example, a user may have to perform various inconvenient set-up procedures when the user desires to switch systems with which the user is utilizing a particular user interface resource. Such set-up procedures may include, for example, performing manual operations to tear down and establish communication links between the user interface resource and the old and new systems. The user may, for example, have to perform such set-up procedures on a multitude of systems, which may even include, for example, the system with which the user no longer desires to utilize the user interface resource.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for managing a user interface resource. A user interface resource and a first system may establish a wireless communication link. The user interface resource and first system may, for example, comprise respective communication modules that establish such a wireless communication link. The communication link establishment may, for example, comprise determining the general compatibility, authorization, and secure communication capability of various systems. The user interface resource and first system may, for example, comprise respective communication, authentication and secure communication modules to assist in performing such determinations.

Various aspects of the present invention may comprise utilizing the user interface resource with the first system. Such utilization may comprise, for example, communicating user interface information between the user interface resource and the first system. The user interface information may, for example, comprise information input from a user and/or output to a user. The user interface information may, for example, comprise user interface information corresponding to the user interface resource or another user interface resource communicatively coupled to the user interface resource. Communication modules in the user interface resource and first system may perform various aspects of such communication.

Various aspects of the present invention may comprise providing a human-perceivable indication to a user that informs the user of the system(s) that the user interface resource is currently being used with. For example, the first system and/or user interface resource may comprise user interface modules that communicate such information to a user.

Various aspects of the present invention may comprise establishing an inter-system communication link between the first system and a second system, where the user interface resource is capable of being used with the second system. Such an inter-system communication link may, for example, be wired, wireless, tethered optical or non-tethered optical. The first system and second system may, for example, comprise respective communication modules to implement the inter-system communication link.

Various aspects of the present invention may comprise communicating a predetermined signal from the user interface resource to the first system over the wireless communication link. Such a predetermined signal may, for example, be communicated by respective communication modules in the user interface resource and first system. The predetermined signal may, for example, be embedded in user interface information communicated to the first system. The first system may, for example, comprise a signal detection module to detect the predetermined signal.

Various aspects of the present invention may provide a user interface through which a user may specify the characteristics of the predetermined signal. For example, the first system may comprise a user interface module that provides for such specification.

Various aspects of the present invention may comprise, after the first system receives the predetermined signal, communicating a hand-off signal from the first system to the second system over the inter-system communication link. The hand-off signal may indicate to the second system that the user interface resource is to be used with the second system. The first system may, for example, comprise a U/I resource management module that utilizes a communication module to communicate the hand-off signal to the second system.

The second system may establish a wireless communication link with the user interface resource. For example, the second system and the user interface resource may comprise respective communication modules to implement the communication link. After the second system receives the hand-off signal from the first system, the second system and the user interface resource may, for example, communicate user interface information over the communication link.

These and other advantages, aspects and novel features of the present invention, as well as details of illustrative aspects thereof, will be more fully understood from the following description and drawings.

DETAILED DESCRIPTION OF THE INVENTION

Figure 1:
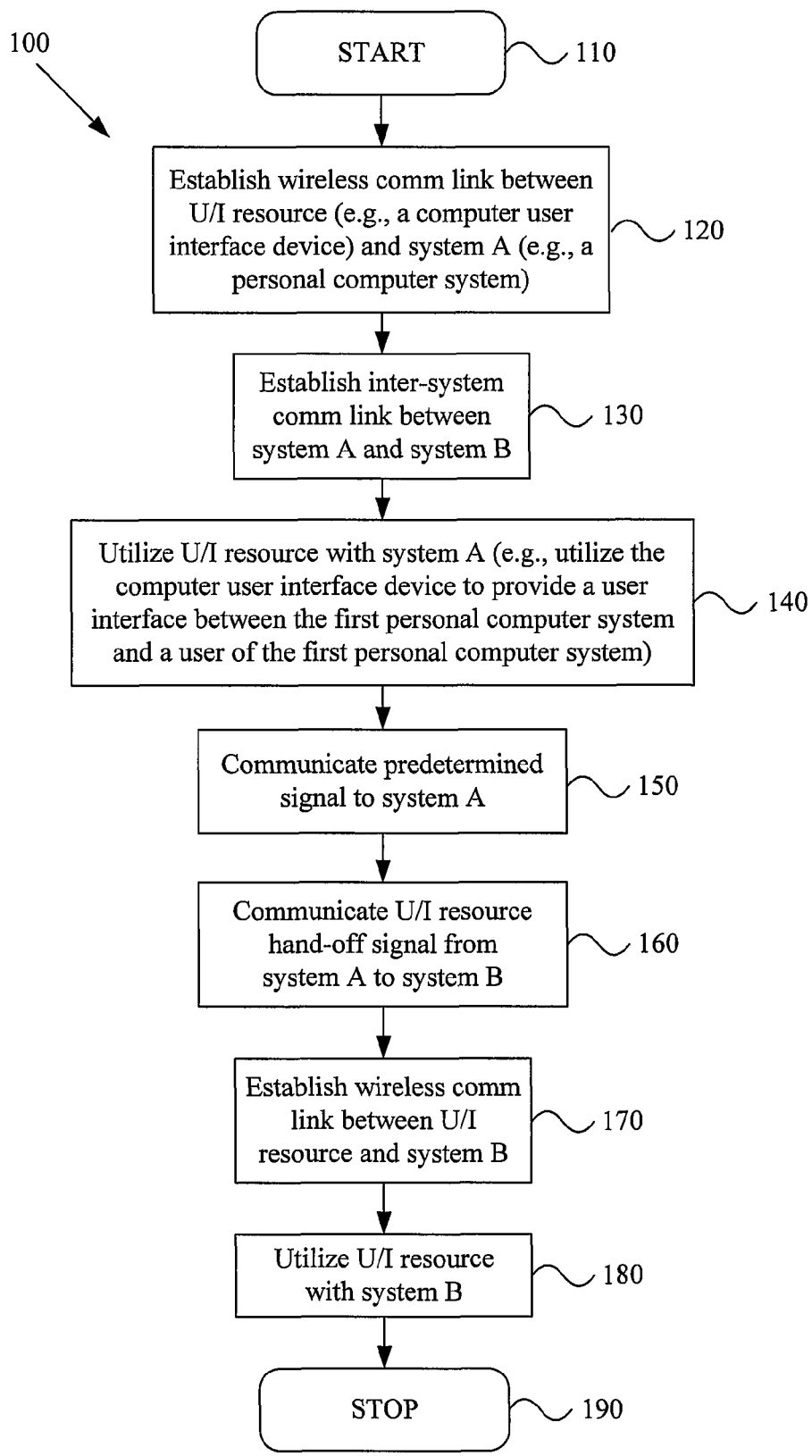
FIG. 1 is a flow diagram illustrating a method for managing a user interface resource, in accordance with various aspects of the present invention.

FIG. 1 is a flow diagram illustrating a method 100 for managing a user interface resource, in accordance with various aspects of the present invention. The method 100 begins at step 110. Various events and conditions may cause the method 100 to begin. For example, a wireless resource may enter the communication boundaries of a wireless communication network. Such an event may occur, for example, when a user carries a portable user interface (U/I) resource into the boundaries of a wireless communication network. Such boundaries may be defined according to wireless signal quality, noise conditions, geographical boundaries, or any of a variety of conditions and characteristics that may define the boundaries of a wireless communication network. Alternatively, for example, a user may initiate the method 100 by powering-up a U/I resource or other device in a wireless communication network. Additionally, for example, a user may explicitly initiate the method 100 by entering a command at the U/I resource or other device. The method 100 may be initiated in a large variety of ways. Accordingly, the scope of various aspects of the present invention should not be limited to particular events and conditions that cause the method 100 to begin.

The U/I resource may comprise a wide variety of devices. Such devices may comprise, for example and without limitation, a mouse, trackball, thumbwheel, touch screen, touch pad, voice recognition system, voice synthesis system, laser scanning system, printer, scanner, keyboard, audio output device, audio input device, video output device, video input device, pager, telephone, cell phone or remote control device. In general, the U/I resource may comprise any device, or portion thereof, through which a user and a system may communicate, including input devices and output devices. Accordingly, the scope of various aspects of the present invention should not be limited by characteristics of particular U/I resources.

The method 100, at step 120, comprises establishing a wireless communication link between the U/I resource and a first system in the communication network. The first system may comprise, for example and without limitation, a computing system, video or audio entertainment system, security system, environmental control system, communication system, home appliance, or any other system that may be advantageously communicatively coupled to a user interface resource. Accordingly, the scope of various aspects of the present invention should not be limited by characteristics of a particular system that may be communicatively coupled to a U/I resource.

Step 120 may, for example, comprise establishing a wireless communication link between the U/I resource and the first system using any of a variety of wireless communication protocols. Such a protocol may be non-standard, such as a supplier's proprietary interface protocol, or standard, such as, for example, IEEE 802.11, IEEE 802.15, Bluetooth and ultra wideband (UWB) protocols. The communication link may, for example, be a contention-free communication channel or a contention-based communication channel. The communication medium may, for example, be a radio frequency (RF) medium or an optical medium. Accordingly, the scope of various aspects of the present invention should not be limited in any way by characteristics of particular communication protocols, media, channels or links.

Step 120 may comprise, for example, determining whether the first system and the U/I resource are available for, and/or capable of, use with each other. Such determination may, for example, comprise determining whether the first system and the U/I resource are authorized for use with each other. Also, such determination may, for example, comprise determining whether a particular user is authorized to use the U/I resource and/or system. Additionally, such determination may, for example, comprise determining and analyzing the secure communication capabilities of the first system and the U/I resource. Further, such determination may, for example, comprise determining and analyzing various other communication and signal processing capabilities of the first system and the U/I resource. Exemplary communication and signal processing capabilities may, without limitation, comprise information type, information translation, data rate, data format, data encoding/decoding, and secure communication capabilities.

For example, in an exemplary scenario where the U/I resource is an audio output device and the first system has no audio output capability, the U/I resource and/or the first system may determine that the first system and the U/I resource are not compatible for use with each other. Accordingly, step 120 may decide not to establish a communication link between the U/I resource and the first system for communicating user interface information.

Additionally, for example, in a scenario where the U/I resource is a video output device only capable of receiving and processing MPEG-4 video information and the first system is only capable of outputting MPEG-2 video information, the U/I resource and/or the first system may determine that the system and U/I resource are not compatible for use with each other. Also, for example, the U/I resource and/or the system may determine that the U/I resource and first system cannot communicate with each other at an appropriate level of security.

In general, the U/I resource and the first system may ascertain and analyze a large number of compatibility characteristics to determine whether to establish a communication link between the first system and the U/I resource for communication of user interface information. Accordingly, the scope of various aspects of the present invention should not be limited by characteristics of particular compatibility determinations.

The method, at step 130, comprises establishing an inter-system communication link between the first system and the second system, where at least a portion of the U/I resource is generally capable of being used with the second system. For example, the first system and second system may establish such a communication link to support managing a U/I resource. The inter-system communication link may have a variety of characteristics. For example and without limitation, the inter-system communication link may be wired, wireless RF, tether optical, or non-tethered optical. Accordingly, the scope of various aspects of the present invention should not be limited by characteristics of particular inter-system communication links.

The method, at step 140, comprises utilizing the U/I resource with the first system. Such utilization may comprise, for example, communicating user interface information between the user interface resource and the first system. The user interface information may comprise information input from a user and/or output to a user. For example, user interface information may comprise keyboard, mouse, microphone and camera information communicated from respective U/I resources to the first system. Additionally, for example, user interface information may comprise audio and video output information communicated from the first system to one or more U/I resources. The user interface information may, for example, be encrypted.

The user interface information may, for example, comprise user interface information corresponding to the user interface resource or corresponding to another user interface resource communicatively coupled to the user interface resource. For example, an exemplary keyboard U/I resource may be communicatively coupled to a mouse U/I resource. The control and utilization aspects of the mouse U/I resource may, for example, be coupled to control and utilization of the keyboard U/I resource. In one exemplary scenario, the user interface information communicated between the first system and the mouse U/I resource may flow through the keyboard U/I resource.

In general, the user interface information may, for example, comprise any information communicated between a system and a user and signals in support of such communication. Accordingly, the scope of various aspects of the present invention should not be limited by characteristics of a particular type of user interface information.

Step 140 may also, for example, comprise communicating to a user which system(s) the user interface resource is being used with. For example and without limitation, the first system may output a graphical indication to a user that indicates to the user that the user interface resource is being used with the first system. In an exemplary scenario where the user interface resource is a keyboard U/I resource and the first system is a desktop computing system, the desktop computing system may display a visual indication on an output device that indicates to the user that the keyboard U/I resource is currently communicating user interface information with the desktop computing system. Alternatively, for example, the U/I resource may communicate to a user which system the U/I resource is currently being used with. In an exemplary scenario, a keyboard U/I resource may comprise a graphical display on which the keyboard U/I resource displays a graphical indication of the first system.

The method 100, at step 150, comprises communicating a predetermined signal from the U/I resource (or other source) to the first system. The predetermined signal may, for example, indicate to the first system that the user desires to utilize the U/I resource with a system other than the first system. For example, a user may utilize the U/I resource to communicate the predetermined signal to the first system to indicate that the user desires to utilize the U/I resource with the second system. Alternatively, for example, the predetermined signal may be communicated to the first system from a source other than the U/I resource.

The predetermined signal may, for example, be a stand-alone signal or may be embedded in another signal, such as, for example, in a signal communicating user interface information between the U/I resource and the first system. The predetermined signal may comprise any of a multitude of signal characteristics. For example, the predetermined signal may comprise numerous sub-signal components in parallel or series. The sub-signal components may themselves, for example, have various predetermined characteristics. Accordingly, the scope of various aspects of the present invention should not be limited by characteristics of a particular predetermined signal.

The predetermined signal may be static and unchangeable, or dynamic and definable. The method 100 may, for example, comprise providing a user interface that enables a user to specify characteristics of the predetermined signal. For example, the U/I resource or the first system may provide an interactive user interface for such purpose.

In an exemplary scenario, the first system may communicate with a keyboard U/I resource to provide a user the ability to define the predetermined signal in terms of one or more signals corresponding to a particular key or key sequence on the keyboard U/I resource. In another exemplary scenario, the first system may communicate with a microphone U/I resource to provide a user the ability to define the predetermined signal in terms of a voice command. In an additional exemplary scenario, the user may associate the predetermined signal with a particular button sequence on a mouse. Alternatively, the U/I resource may comprise a dedicated input with which the user may cause the U/I resource to generate the predetermined signal. Accordingly the scope of various aspects of the present invention should not be limited by characteristics of a particular method of apparatus for defining characteristics of the predetermined signal.

Step 150 may comprise, for example, the first system receiving the predetermined signal from the U/I resource (or another source) and detecting the predetermined signal. The first system may, for example, analyze information communicated between the U/I resource and the first system. For example, the first system may listen for the predetermined signal on a dedicated control communication channel or may listen for the predetermined signal embedded in information communicated between the U/I resource and the first system on a data communication channel.

The method 100, at step 160, comprises communicating a U/I resource hand-off signal from the first system to the second system. The U/I resource hand-off signal (which may also be referred to herein as the hand-off signal) may indicate to the second system that the user interface resource is to be used with the second system.

The hand-off signal may comprise a large variety of characteristics. For example and without limitation, the hand-off signal may only indicate a handing off of the U/I resource to the second system. Alternatively, for example, the hand-off signal may comprise information of the identity and/or characteristics of the U/I resource. Additionally, various U/I resources may be utilized with a plurality of systems simultaneously, and various U/I resources may be utilized with only a single system at one time. In a scenario where the U/I resource may be utilized with multiple devices simultaneously, the hand-off signal may or may not comprise an indication of whether the corresponding U/I resource is to be utilized with a plurality of systems simultaneously. Accordingly, the scope of various aspects of the present invention should by no means be limited by characteristics of a particular hand-off signal.

Step 160 may, for example, comprise automatically communicating a hand-off signal to the second system or initiating non-automatic operations to communicate the hand-off signal. For example, step 160 may, for example, comprise responding to receipt to the predetermined signal by providing a user interface with which a user may specify a particular system that the user desires to utilize the U/I resource with. For example, such a user interface may present a user with a list of available systems with which the U/I resource may be used. Step 160 may then receive a user indication of the desired system and respond by communicating the appropriate hand-off signal with the appropriate system.

The method 100, at step 170, comprises establishing a wireless communication link between the U/I resource and the second system. Step 170 may, for example, comprise performing processing similar to that discussed with regard to step 120. Such a communication link may, for example, be utilized in the communication of user interface information between the U/I resource and the second system.

The method 100, at step 180, comprises utilizing the U/I resource with the second system. For example, after receiving the hand-off signal from the first system, the second system may communicate user interface information with the U/I resource. Step 180 may comprise, for example, various utilization aspects discussed with regard to step 140. For example, step 180 may comprise establishing and maintaining one or more wireless communication links for utilization of the U/I resource with the second system. Step 180 may then comprise, for example, communicating user interface information over such communication links. In one exemplary scenario, after the second system receives the hand-off signal from the first system, the second system may then implement one or more of the method 100 steps.

Figure 2:
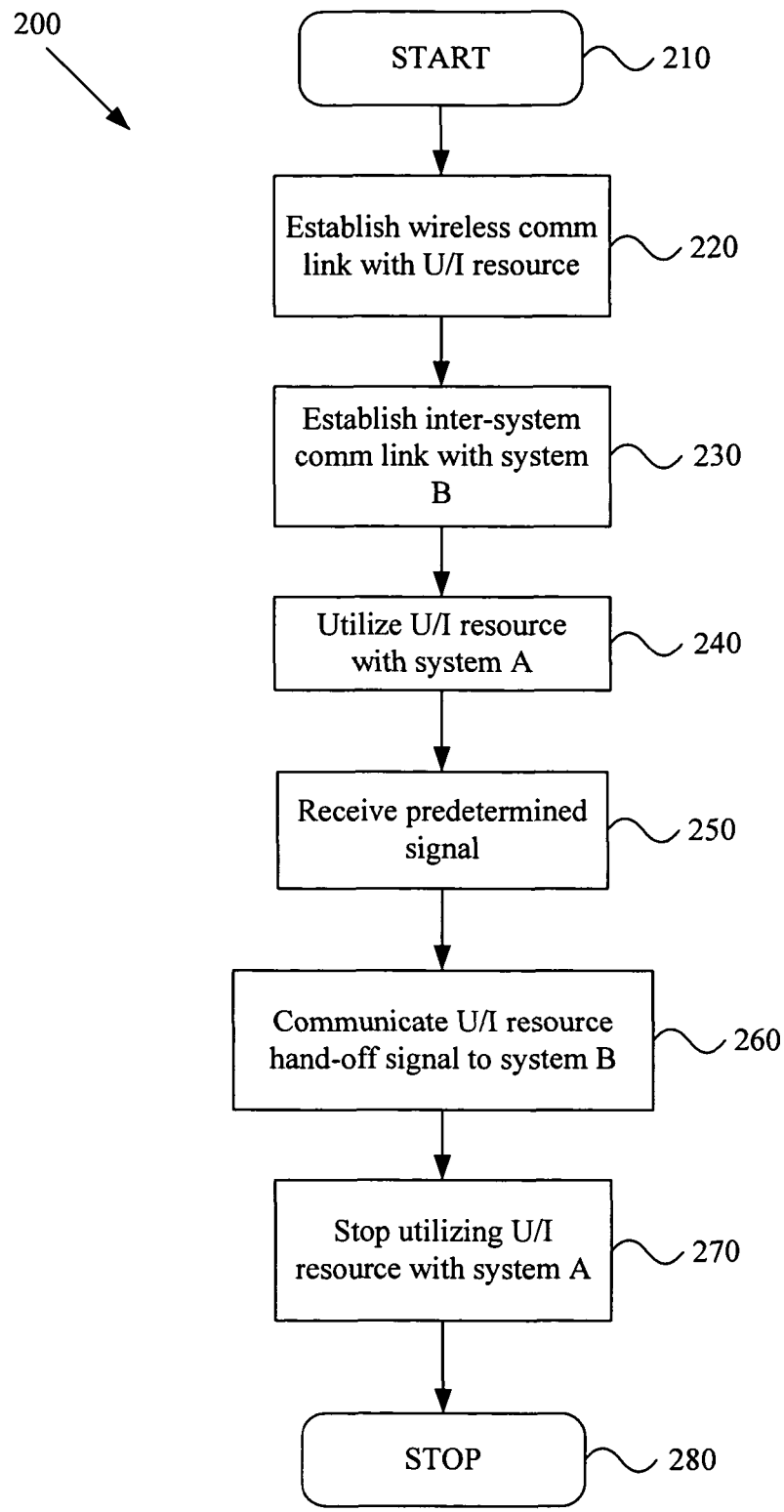
FIG. 2 is a flow diagram illustrating a method for managing a user interface resource, in accordance with various aspects of the present invention.

The exemplary method 100 illustrated in FIG. 1 illustrates a portion of various aspects of the present invention. FIG. 2 provides a second exemplary method 200 to illustrate further aspects of the present invention and to further illustrate at least a portion of the various aspects introduced by FIG. 1 and the previous discussion.

FIG. 2 is a flow diagram illustrating a method 200 for managing a user interface resource in accordance with various aspects of the present invention. FIG. 2 will be discussed in the context of an exemplary U/I resource management scenario and from the point of view of a first system implementing the method 200. The details of the exemplary scenario are merely illustrative and should by no means limit the scope of various aspects of the present invention.

Figure 4:
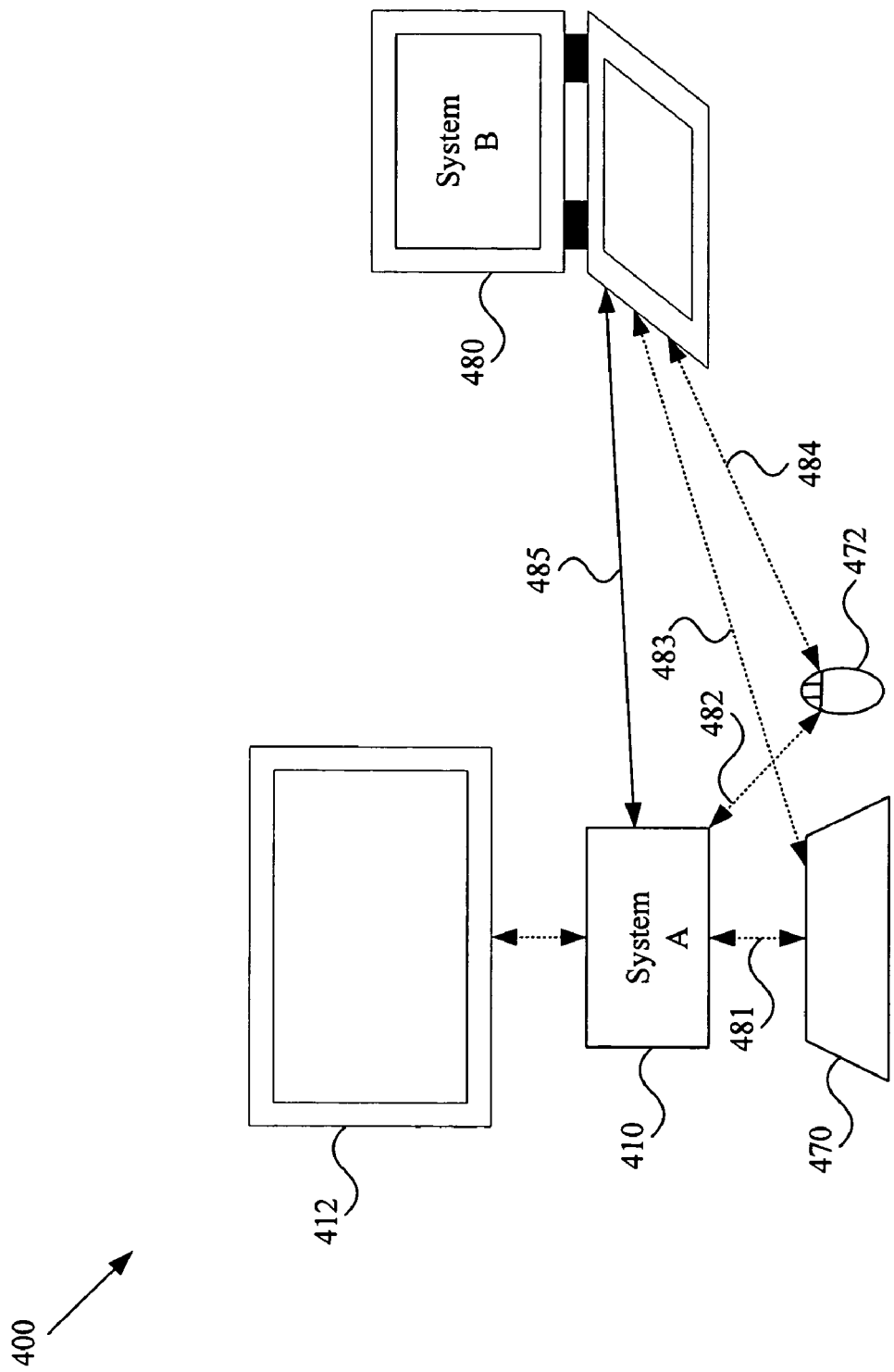
FIG. 4 is a diagram showing an exemplary user interface resource management environment, in accordance with various aspects of the present invention.

FIG. 4 is a diagram showing the exemplary user interface resource management environment 400 in accordance with various aspects of the present invention. The following discussion regarding the method 200 illustrated in FIG. 2 will be discussed in view of the exemplary illustrative environment 400. The exemplary environment 400 comprises a first system 410 (e.g., a desktop computing system) and a second system 480 (e.g., a laptop computing system). The desktop computer 410 is communicatively coupled to a video output display U/I resource 412. The exemplary environment 400 also comprises a keyboard U/I resource 470 and a mouse U/I resource 472.

Referring back to FIG. 2, the method 200 begins at step 210. As discussed previously with regard to step 110 of the exemplary method 100 illustrated in FIG. 1, step 210 may be triggered or initiated by a wide array of events and conditions. In the exemplary scenario, a user powers up the exemplary keyboard U/I resource 470 in a networked office environment 400 that comprises the desktop computer 410 and the laptop computer 480.

The method 200, at step 220, comprises the first system establishing a wireless communication link with the U/I resource. Various exemplary aspects of establishing communication links were generally discussed previously with regard to step 120 of the method 100 illustrated in FIG. 1. In the exemplary scenario, the desktop computer 410 establishes a wireless RF communication link (e.g., based on IEEE 802.11) with the keyboard U/I resource 470.

The method 200, at step 230, comprises the first system establishing an inter-system communication link with a second system. Various exemplary aspects of establishing such an inter-system communication link were generally discussed previously with regard to step 130 of the method 100 illustrated in FIG. 1. In the exemplary scenario, the desktop computer 410 establishes a communication link with the laptop computer 480.

The method 200, at step 240, comprises utilizing the U/I resource with the first system. Various exemplary aspects of utilizing the U/I resource with the first system were generally discussed previously with regard to step 140 of the method 100 illustrated in FIG. 1. In the exemplary scenario, a user may utilize the keyboard U/I resource 470 with the desktop computer 410.

The method 200, at step 250, comprises the first system receiving a predetermined signal from the U/I resource (or other source). Various exemplary aspects of communicating a predetermined signal to the first system were generally discussed previously with regard to step 150 of the method 100 illustrated in FIG. 1. In the exemplary scenario, the desktop computer 410 receives a predetermined signal from the keyboard U/I resource 470.

The method 200, at step 260, comprises communicating a U/I resource hand-off signal from the first system to the second system. Various exemplary aspects of communicating a hand-off signal were generally discussed previously with regard to step 160 of the method 100 illustrated in FIG. 1. In the exemplary scenario, the desktop computer 410 communicates a hand-off signal to the laptop computer 480. The desktop computer 410 may, for example, communicate the hand-off signal to the laptop computer 480 using the inter-system communication link established in step 230.

The method 200, at step 270, comprises stopping utilization of the U/I resource with the first system. Various exemplary aspects of stopping utilization of the method 200 were generally discussed with regard to step 190 of the method 100 illustrated in FIG. 1. In the exemplary scenario, the desktop computer 410 stops communicating user interface information with the keyboard U/I resource 470.

Figure 3:
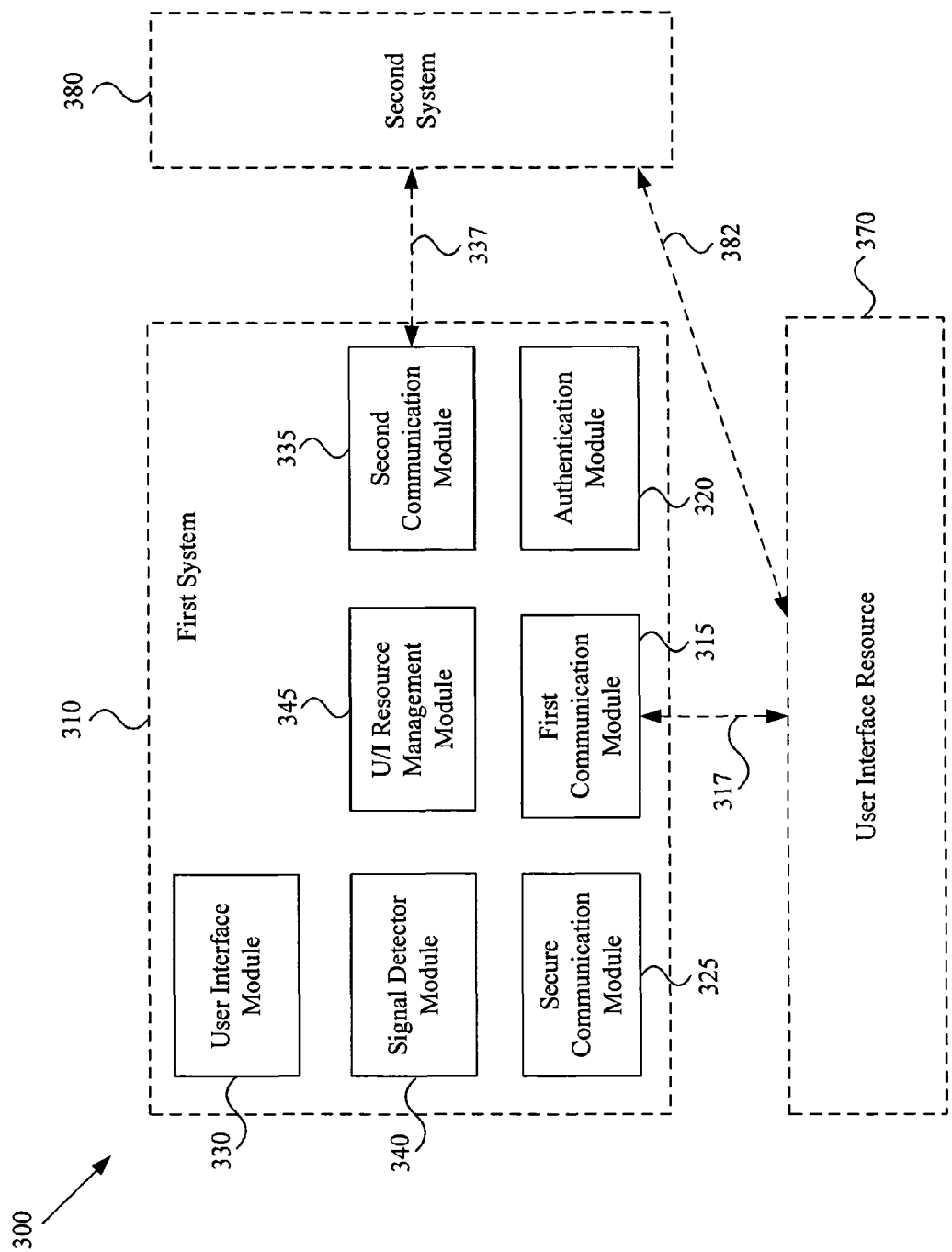
FIG. 3 is a diagram illustrating a system for managing a user interface resource, in accordance with various aspects of the present invention.

FIG. 3 is a diagram illustrating a system 300 for managing a user interface resource, in accordance with various aspects of the present invention. The system 300 and various components of the system 300 may, for example, implement various aspects of the present invention as discussed previously with regard to the methods 100, 200 illustrated in FIGS. 1 and 2. Note, however, that the structure and operation of the various components of the system 300 should not be limited to structure performing the various aspects of the present invention as discussed previously with regard to the methods 100, 200 illustrated in FIGS. 1 and 2.

The exemplary system 300 comprises an exemplary user interface (U/I) resource 370, a first system 310 and a second system 380. The first system 310 may, for example, comprise a first communication module 315, authentication module 320, secure communication module 325, user interface module 330, second communication module 335, signal detector module 340, and U/I resource management module 345. The second system 380 may, for example, comprise one or more of the modules described with respect to the first system 310. The U/I resource 370 may, for example, comprise various communication modules and processing modules.

The U/I resource 310 may comprise a wide variety of devices. Such devices may comprise, for example and without limitation, a mouse, trackball, thumbwheel, touch screen, touch pad, voice recognition system, voice synthesis system, laser scanning system, printer, scanner, keyboard, audio output device, audio input device, video output device, video input device, pager, telephone, cell phone or remote control device. In general, the U/I resource 370 may comprise any device through which a user and a system may communicate, including input devices, output devices and combinations thereof. Accordingly, the scope of various aspects of the present invention should not be limited by characteristics of particular U/I resources.

The first system 310 and second system 380 may comprise, for example and without limitation, a computing system, video or audio entertainment system, security system, environmental control system, communication system, home appliance, or any other system with which the U/I resource 370 may be utilized. Accordingly, the scope of various aspects of the present invention should not be limited by characteristics of a particular system that may be communicatively coupled to a U/I resource.

The first system 310 may, for example, comprise a first communication module 315 that establishes a wireless communication link with one or more U/I resources. The first communication module 315 may be utilized, for example, to implement various operations discussed previously with regard to the methods 100, 200 illustrated in FIGS. 1 and 2. For example, the first communication module 315 may establish a wireless communication link 317 with a U/I resource such as, for example, the U/I resource 370.

The first communication module 315 may utilize the first communication module 315 and the wireless communication link 317 to communicate a variety of information with the U/I resource 370. Such information may comprise, for example, control information and data information. The information may comprise, for example, user interface information communicated between the first system 310 and the U/I resource 370. The information may comprise, for example, user interface information communicated between the first system 310 and a second U/I resource, which may be communicatively coupled to the U/I resource 370. In general, the user interface information may, for example, comprise any information communicated between a system and a user. Accordingly, the scope of various aspects of the present invention should not be limited by characteristics of a particular type of user interface information or other information communicated between the first system 310 and the U/I resource 370.

For example and without limitation, the first communication module 315 may establish a wireless communication link between the first system 310 and the U/I resource 370 using any of a variety of wireless communication protocols. Such a protocol may be non-standard, such as a supplier's proprietary interface protocol, or standard, such as, for example, IEEE 802.11, IEEE 802.15, Bluetooth and ultra wideband (UWB) protocols. The communication link may, for example, be a contention-free communication channel or a contention-based communication channel. The communication medium may, for example, be a radio frequency (RF) medium or an optical medium. Accordingly, the scope of various aspects of the present invention should not be limited in any way by characteristics of particular communication protocols, media, channels, links, or methods and apparatus related thereto.

The first communication module 315 may perform processing to determine whether the U/I resource 370 and the first system 310 are capable of use with each other. For example, the first communication module 315 may determine whether the first system 310 and the U/I resource 370 are available for, and/or capable of, use with each other. Such determination may, for example, comprise determining and analyzing various communication and signal processing capabilities of the first system 310 and the U/I resource 370. Exemplary communication and signal processing capabilities may, without limitation, comprise information type, information translation, data rate, data format, data encoding/decoding, and secure communication capabilities. The previous examples are merely examples of compatibility determinations that the first communication module 315 or other module may perform. Accordingly, the scope of various aspects of the present invention should not be limited by characteristics of particular compatibility determinations and related processing methods and apparatus.

The first system 310 may comprise, for example, an authentication module 320 that performs authentication and authorization processing to determine whether various systems and resources are authorized for use with each other. The authentication module 320 may be utilized, for example, to implement various authentication/authorization operations as discussed previously with regard to the methods 100, 200 illustrated in FIGS. 1 and 2. For example and without limitation, the first communication module 315 may utilize the authentication module 320 during the establishment of a communication link with the U/I resource 370 to determine whether the U/I resource 370, or a user thereof, is authorized for use with the first system 310.

The first system 310 may, for example, comprise a secure communication module 325 that provides secure communication capability to the first system 310. The secure communication module 325 may be utilized, for example, to implement various secure communication operations as discussed previously with regard to the methods 100, 200 illustrated in FIGS. 1 and 2. For example, the first communication module 315 may utilize the secure communication module 325 to securely communicate information between the first system 310 and the U/I resource 370. Additionally, for example, the first communication module 315 may utilize various aspects of the secure communication module 325 to determine whether the first system 310 and the U/I resource 370 are compatible for secure communications.

The first system 310 may, for example, comprise a user interface module 330 that provides for user interface with the first system 310. The user interface module 330 may be utilized, for example, to implement various user interface operations as discussed previously with regard to the methods 100, 200 illustrated in FIGS. 1 and 2. For example, the user interface module 330 may output an indication (e.g., a graphical, textual, or audible indication) to a user that indicates to the user that the user interface resource 370 is being used with the first system 310.

The first system 310 may, for example, comprise a second communication module 335 that may establish an inter-system communication link 337 between the first system 310 and the second system 380. The second communication module 335 may be utilized, for example, to implement various communication operations as discussed previously with respect to the methods 100, 200 illustrated in FIGS. 1 and 2. The inter-system communication link may have a variety of characteristics. For example and without limitation, the inter-system communication link may be wired, wireless RF, tether optical, or non-tethered optical. Accordingly, the scope of various aspects of the present invention should not be limited by characteristics of particular inter-system communication links or related methods and apparatus.

The first system 310 may, for example, comprise a signal detector module 340 that detects a predetermined signal communicated to the first system 310. The signal detector module 340 may be utilized, for example, to implement various signal detection operations as discussed previously with regard to the methods 100, 200 illustrated in FIGS. 1 and 2. For example, the signal detector module 340 may detect a predetermined signal communicated from the U/I resource 370 to the first system 310. The predetermined signal may, for example, indicate to the first system 310 that a user desires to utilize the U/I resource 370 with a system other than the first system 310. For example, a user may utilize the U/I resource 370 to communicate the predetermined signal to the first system 310 to indicate that the user desires to utilize the U/I resource 370 with the second system 380.

The predetermined signal may, for example, be a stand-alone signal or may be embedded in another signal, such as, for example, in a signal communicating user interface information between the U/I resource 370 and the first system 310. The predetermined signal may comprise any of a multitude of signal characteristics. For example, the predetermined signal may comprise numerous sub-signal components in parallel or series. The sub-signal components may themselves, for example, have various predetermined characteristics. Accordingly, the scope of various aspects of the present invention should not be limited by characteristics of a particular predetermined signal or of methods and apparatus related to the processing of such a signal.

The predetermined signal may be static and unchangeable, or dynamic and definable. The user interface module 330 of the first system 310 may, for example, provide a user interface that enables a user to specify characteristics of the predetermined signal. Alternatively, the U/I resource 370 or the second system 380 may, for example, provide an interactive user interface for such purpose.

In an exemplary scenario, the first communication module 315 of the first system 310 may communicate with an exemplary keyboard U/I resource to provide a user the ability to define the predetermined signal to comprise one or more signals corresponding to a particular key or key sequence on the keyboard U/I resource. In another exemplary scenario, the first communication module 315 of the first system 310 may communicate with a microphone U/I resource to provide a user the ability to define the predetermined signal in terms of a voice command. In an additional exemplary scenario, the user may associate the predetermined signal with a particular button sequence on a mouse U/I resource. Alternatively, the U/I resource 370 may, for example, comprise a dedicated input with which the user may cause the U/I resource 370 to generate the predetermined signal. Accordingly the scope of various aspects of the present invention should not be limited by characteristics of a particular method of apparatus for defining characteristics of the predetermined signal.

The first system 310 may comprise, for example a U/I resource management module 345 that generally performs management activities for a user interface resource that is communicatively coupled to the first system 310. The U/I resource management module 345 may be utilized, for example, to implement various U/I resource management operations as discussed previously with regard to the methods 100, 200 illustrated in FIGS. 1 and 2.

For example and without limitation, after the signal detector module 340 detects a predetermined signal communicated to the first system 310 (e.g., from the U/I resource 370), the U/I resource management module 345 may automatically communicate a U/I resource hand-off signal from the first system 310 to the second system 380. The U/I resource management module 345 may, for example, utilize the second communication module 335 to communicate the U/I resource hand-off signal to the second system 380 over the inter-system communication link 337. The U/I resource hand-off signal (which may also be referred to herein as the hand-off signal) may indicate to the second system 380 that the user interface resource 370 is to be used with the second system 380. The hand-off signal may comprise a large variety of characteristics, as discussed previously. Accordingly, the scope of various aspects of the present invention should by no means be limited by characteristics of a particular hand-off signal or related methods and apparatus.

Alternatively, for example the U/I resource management module 345 may utilize the user interface module 330 to provide a user interface with which a user may specify a particular system that the user desires to utilize the U/I resource 370 with. For example, such a user interface may present a user with a list of available systems with which the U/I resource may be used. The U/I resource management module 345 may then, for example, receive an indication of the specified system from the user interface module 330 and respond by communicating the appropriate hand-off signal with the appropriate system(s).

After the second system 380 receives the hand-off signal from the first system 370, the U/I resource 370 may, for example, be utilized with the second system 380. Such utilization may, for example, be similar to the utilization discussed previously with regard to the methods 100, 200 shown in FIGS. 1 and 2 (e.g., step 180). Such utilization may comprise communicating a variety of information between the second system 380 and the U/I resource 370. Such communication may occur, for example, over a wireless communication link 382 established between the second system 380 and the U/I resource 370. Such a communication link 382 may, for example, be similar to the wireless communication link 317 established between the first system 310 and the U/I resource 370. Alternatively, such a communication link may, for example, comprise characteristics customized for use of the U/I resource 370 with the second system 380.

The exemplary system 300 illustrated in FIG. 3 illustrates various exemplary modules to perform various tasks according to various aspects of the present invention. The modules may be implemented in hardware, software or a combination thereof. The modules may be segregated or may, for example, be integrated onto a single integrated circuit. Additionally, the modules may swap or share various functional operations and various hardware and software sub-modules. Accordingly, the scope of various aspects of the present invention should by no means be limited by particular functional or structural boundaries of the exemplary system 300 or components thereof.

FIG. 4 is a diagram showing an exemplary user interface resource management environment 400 in accordance with various aspects of the present invention. The exemplary environment 400 comprises a first system 410 and a second system 480. The first system 410 is communicatively coupled to a display U/I resource 412. The first system 410 is communicatively coupled to a keyboard U/I resource 470 with a first wireless communication link 481 and communicatively coupled to a mouse U/I resource 472 over a second wireless communication link 482. The second system 480 is communicatively coupled to the keyboard U/I resource 470 over a third wireless communication link 483 and communicatively coupled to the mouse U/I resource 472 over a fourth wireless communication link 484. The first system 410 and second system 480 are communicatively coupled with an inter-system communication link 485.

The first system 410 and the second system 480 may, for example, comprise various characteristics of the first system 310 and second system 380 discussed previously with regard to FIG. 3. The first system 410 and the second system 480 may, for example, perform various aspects of the methods 100, 200 illustrated in FIGS. 1 and 2.

In an exemplary scenario, a user may initially use the keyboard U/I resource 470 and the mouse U/I resource 472 with the first system 410. The user or various system components may have, for example, defined the characteristics of a predetermined signal. When the user desires to use the keyboard U/I resource 470 and mouse U/I resource 472 with the second system, the user may, for example, cause the keyboard U/I resource 470 and mouse U/I resource 472 to communicate the predetermined signal to the first system 410. For example, the user may press a particular key or key sequence on the keyboard U/I resource 470 or a particular key or key sequence on the mouse U/I resource 472 to cause the generation of respective predetermined signals.

After receipt of the predetermined signals from the keyboard U/I resource 470 and/or mouse U/I resource 472, the first system 410 may communicate a U/I resource hand-off signal to the second system 480 over the inter-system communication link 485. The hand-off signal may, for example, communicate to the second system 480 that one or both the U/I resource(s) 470, 472 is to be used with the second system 480. The user may then use the keyboard U/I resource 470 and/or the mouse U/I resource 472 with the second system 480. Such use may comprise communicating user-interface information between the second system 480 and the U/I resources 470, 472 over their respective communication links 483, 484.

Figure 5:
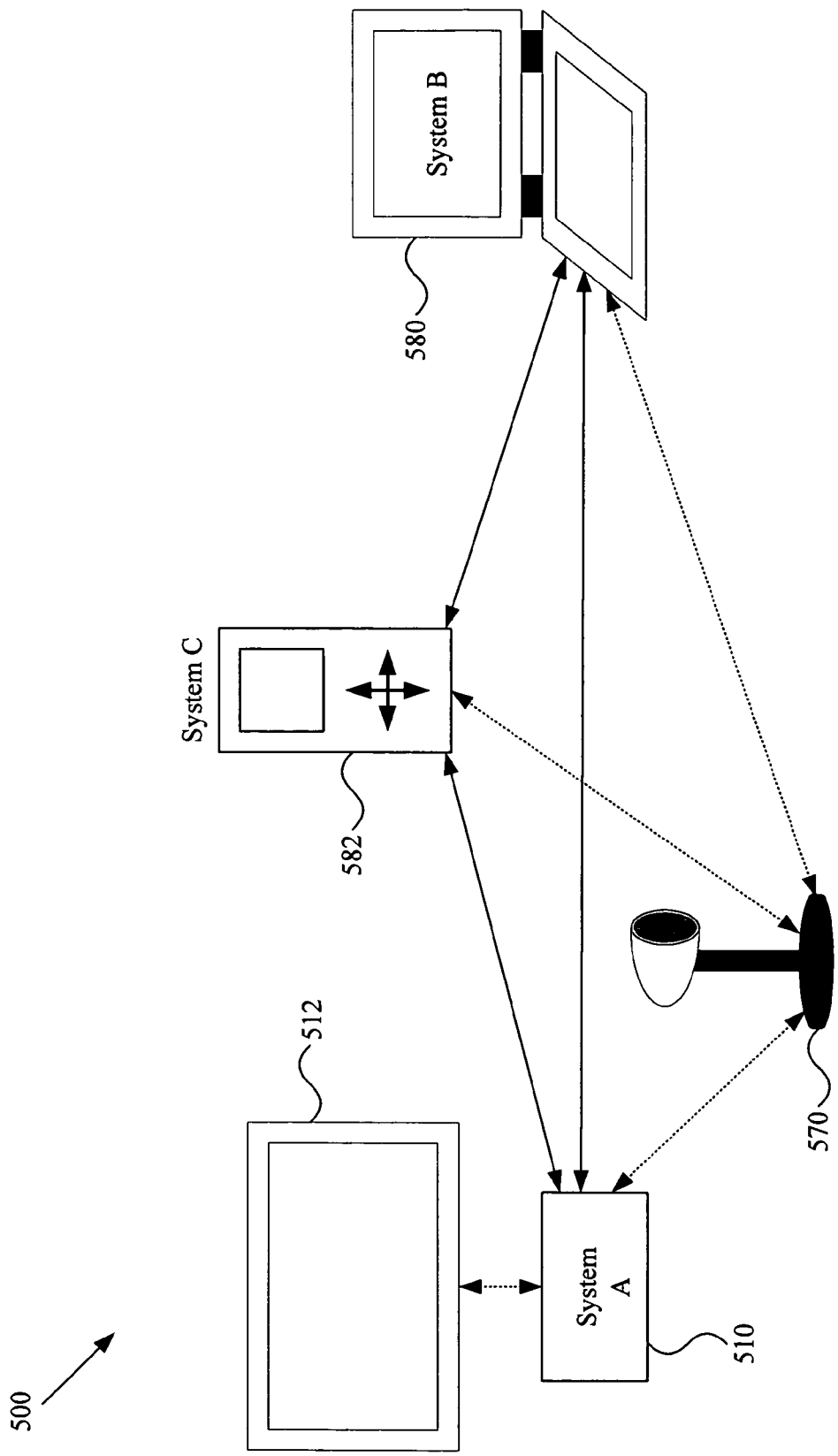
FIG. 5 is a diagram illustrating an exemplary user interface resource management environment, in accordance with various aspects of the present invention.

FIG. 5 is a diagram showing an exemplary user interface resource management environment 500 in accordance with various aspects of the present invention. The exemplary environment 500 comprises a first system 510, second system 580 and third system 582. The first system 510, second system 580 and third system 582 may comprise, for example, an audio recording system, laptop computer and personal digital assistant, respectively. The exemplary environment 500 comprises a microphone U/I resource 570 and a display U/I resource 512, which is communicatively coupled to the first system 510. The microphone U/I resource 570 is communicatively coupled to the first system 510, second system 580 and third system 582. The first system 510, second system 580 and third system 582 are communicatively coupled by inter-system communication links.

The first system 510, second system 580 and third system 582 may, for example, comprise various characteristics of the first system 310 and second system 380 discussed previously with regard to FIG. 3. The first system 510, second system 580 and third system 582 may, for example, perform various aspects of the methods 100, 200 illustrated in FIGS. 1 and 2.

In an exemplary scenario, a user may initially use the microphone U/I resource 570 with the first system 510. The user or various system components may have, for example, defined the characteristics of one or more predetermined signals, such as, for example a voice command. Such voice command may, for example, comprise an indication of which system the user desires to use the microphone U/I resource 570 with. The user may have, for example, defined the predetermined signal characteristics, at least in part, by using a user interface provided by any of the first system 510, second system 580 and third system 582.

When the user desires to use the microphone U/I resource 570 with the second system 580, the user may, for example, cause the microphone U/I resource 570 to communicate a predetermined signal to the first system 510 (or alternatively, the second system 580 and/or the third system 582). For example, the user may speak a particular word or phrase on the microphone U/I resource 570 to cause the generation of the desired predefined signals.

For example, assume the user causes the microphone U/I resource 570 to generate a predefined signal that indicates the user desires to utilize the microphone with the second system 580. After receipt of the predefined signal from the microphone U/I resource 570, the first system 510 may, for example, communicate a U/I resource hand-off signal to the second system 580 over an inter-system communication link. The hand-off signal may, for example, communicate to the second system 580 that the microphone U/I resource 570 is to be used with the second system 580. The user may then use the microphone U/I resource 570 with the second system 580. Such use may comprise communicating user interface information between the second system 580 and the microphone U/I resources 570 over a wireless communication link.

Further, for example, if a user then desires to utilize the microphone U/I resource 570 with the third system 582, the user may cause the microphone U/I resource 570 (or alternative resource or system) to communicate a predefined signal to the second system 580. The second system 580 may then communicate a U/I resource hand-off signal to the third system 582, after which, for example, the user may utilize the microphone U/I resource 570 with the third system 582.

In various U/I resource configurations, a first U/I resource may perform U/I resource management functions for a second U/I resource. In such a configuration, referring back to FIG. 3, the U/I resource 370 may, for example, comprise a U/I resource interface module that communicatively couples a second U/I resource to the U/I resource 370.

Figure 6:
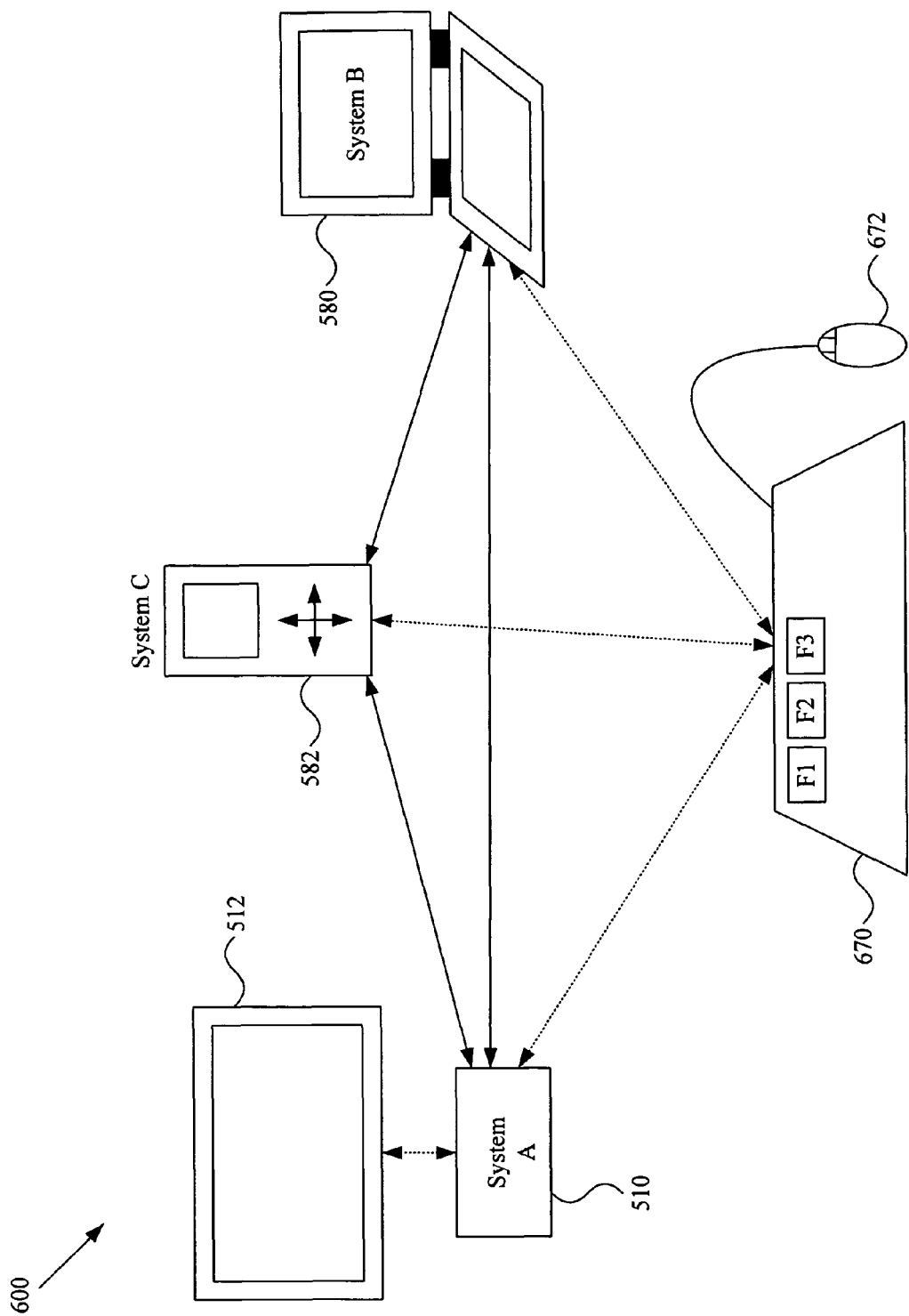
FIG. 6 is a diagram illustrating an exemplary U/I resource proxy configuration, in accordance with various aspects of the present invention.

FIG. 6 is a diagram illustrating an exemplary U/I resource proxy configuration 600 in accordance with various aspects of the present invention. In particular, FIG. 6 illustrates an exemplary keyboard/mouse U/I resource configuration 600 in accordance with various aspects of the present invention. In one exemplary scenario, the keyboard U/I resource 670 is communicatively coupled to a mouse U/I resource 672. The keyboard U/I resource 670 may, for example, manage the mouse U/I resource 672.

A user may, for example, utilize the keyboard U/I resource 670 and mouse U/I resource 672 as a combined U/I resource. The user may, for example, communicate a particular predefined signal to specify that the keyboard U/I resource 670 and the mouse U/I resource 672 are to be used with a particular system. A system receiving the predefined signal may, for example, hand-off the keyboard U/I resource 670 and the mouse U/I resource 672 for use with the specified system. That is, the system may communicate a hand-off signal to the specified system indicating that the keyboard U/I resource 670 and the mouse U/I resource 672 are to be used with the specified system.

The keyboard U/I resource 670 may, for example, serve as a communication conduit for information communicated between the mouse U/I resource 672 and the specified system. The keyboard U/I resource 670 may further, for example, perform signal processing necessary to adequately utilize the mouse U/I resource 672 with the specified system. Alternatively, for example, the keyboard U/I resource 670 may merely communicate the predefined hand-off signal on behalf of the mouse U/I resource 672 and leave the mouse U/I resource 672 and the specified system to establish, maintain and utilize their own communication links.

The illustration in FIG. 6 and discussion thereof is exemplary and should by no means limit the scope of various aspects of the present invention to the exemplary keyboard/mouse U/I resource configuration 600. Various aspects of the present invention may comprise a large variety of user interface resources managing other user interface resources. For example and without limitation, a video display U/I resource may manage an audio speaker U/I resource, a DVD player U/I resource may manage a camera U/I resource, and a motion picture U/I resource may manage a microphone U/I resource.

In summary, aspects of the present invention provide a system and method for managing the allocation and utilization of user interface resources in a communication system. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will comprise all embodiments falling within the scope of the appended claims.

What is claimed is:

1. A method for managing a computer user interface device, the method comprising:
   - establishing a wireless communication link between a computer user interface device and a first personal computer system;
   - utilizing the computer user interface device to provide a user interface between the first personal computer system and a user of the first personal computer system;
   - establishing an inter-system communication link between the first personal computer system and a second system;
   - communicating a predetermined signal from the computer user interface device to the first personal computer system; and
   - in response to receiving the predetermined signal at the first personal computer system, at least:
     - communicating a hand-off signal from the first personal computer system to the second system over the inter-system communication link, the hand-off signal indicating that the computer user interface device and a second computer user interface device are to be used to provide a user interface between the second system and a user of the second system instead of to provide a user interface between the first personal computer system and a user of the first personal computer system;
     - establishing a second wireless communication link between the computer user interface device and the second system; and
     - communicating user interface information between the second system and both of the computer user interface device and the second computer user interface device over the second wireless communication link.

2. The method of claim 1, wherein communicating the predetermined signal from the computer user interface device to the first personal computer system comprises communicating the predetermined signal over a data channel.

3. The method of claim 1, wherein communicating the predetermined signal from the computer user interface device to the first personal computer system comprises communicating the predetermined signal over a dedicated control channel.

4. The method of claim 1, wherein:
   - the first computer user interface device comprises a keyboard;
   - the second computer user interface device comprises a mouse; and
   - the keyboard serves as a communication conduit for all information between the mouse and the second system.

5. The method of claim 1, comprising providing, on the computer user interface device, a human-perceivable indication of which system(s) the computer user interface device is being used with.

6. The method of claim 1, comprising providing a user interface with which a user may specify characteristics of the predetermined signal.

7. The method of claim 1, comprising providing a user interface with which a user may define a particular user input that, when input by the user, will cause the computer user interface device to communicate the predetermined signal to the first personal computer system.

8. In a first personal computer system, a method for managing a computer user interface device, the method comprising:
   - establishing a wireless communication link with the computer user interface device;
   - utilizing the computer user interface device to provide a user interface between the first personal computer system and a user of the first personal computer system;
   - establishing a second communication link with a second system;
   - receiving a predetermined signal from the computer user interface device over the wireless communication link; and
   - in response to receiving the predetermined signal from the computer user interface device, communicating a hand-off signal to the second system over the second communication link, the hand-off signal indicating to the second system that the computer user interface device is to be used to provide a user interface between the second system and a user of the second system instead of to provide a user interface between the first personal computer system and a user of the first personal computer system.

9. The method of claim 8, further comprising, prior to receiving the predetermined signal from the computer user interface device, communicating user interface information with the computer user interface device over the wireless communication link, and wherein the predetermined signal is embedded in the user interface information communicated in a data channel.

10. The method of claim 8, wherein the hand-off signal indicates that the computer user interface device and a second computer user interface device are to be used to provide a user interface between the second system and a user of the second system.

11. The method of claim 8, comprising, prior to receiving the predetermined signal from the computer user interface device, providing a human-perceivable indication that the computer user interface device is being used with the first personal computer system.

12. The method of claim 8, comprising, in response to receiving the predetermined signal from the computer user interface device, providing a human-perceivable indication that the computer user interface device is being used with the second system.

13. The method of claim 8, comprising providing a user interface with which a user may specify characteristics of the predetermined signal.

14. The method of claim 8, comprising providing a user interface with which a user may associate a particular user input with the predetermined signal.

15. The method of claim 8, wherein establishing a wireless communication link comprises determining whether the computer user interface device is authorized for use with the first personal computer system.

16. A first personal computer system for managing use of a computer user interface device, the first personal computer system comprising at least one module that is operable to, at least:
    establish a wireless communication link with a computer user interface device;
    utilize the computer user interface device to provide a user interface between the first personal computer system and a user of the first personal computer system;
    establish a communication link between the first personal computer system and a second system;
    detect a predetermined signal communicated to the first personal computer system from the computer user interface device; and
    in response to detecting the predetermined signal, communicate a hand-off signal to the second system, the hand-off signal indicating to the second system that the computer user interface device is to be used to provide a user interface between the second system and a user of the second system instead of to provide a user interface between the first personal computer system and a user of the first personal computer system.

17. The first personal computer system of claim 16, wherein the at least one module is operable to detect the predetermined signal embedded in user interface information communicated in a data channel between the first personal computer system and the computer user interface device.

18. The first personal computer system of claim 16, wherein the hand-off signal indicates that the computer user interface device and a second computer interface device are to be used to provide a user interface between the second system and a user of the second system.

19. The first personal computer system of claim 16, wherein the at least one module is operable to, prior to the first personal computer system receiving the predetermined signal from the computer user interface device, provide a human-perceivable indication that the computer user interface device is being used with the first personal computer system.

20. The first personal computer system of claim 16, wherein the at least one module is operable to, after the first personal computer system receives the predetermined signal from the computer user interface device, provide a human-perceivable indication that the computer user interface device is being used with the second system.

21. The first personal computer system of claim 16, wherein the at least one module is operable to provide a user interface to a user, the user interface providing to the user the capability to specify characteristics of the predetermined signal.

22. The first personal computer system of claim 16, wherein the at least one module is operable to provide a user interface with which a user may associate a particular user input with the predetermined signal.

23. The first personal computer system of claim 16, wherein the at least one module is operable to perform authentication processing, the authentication processing comprising determining whether the computer user interface device is authorized for use with the first personal computer system.

24. The method of claim 1, wherein the computer user interface device is a user input device for a personal computer system.

25. The method of claim 1, wherein the computer user interface device is a touch-based input device with which a user inputs information to a personal computer system.

26. The method of claim 1, wherein the computer user interface device is a computer mouse and/or computer keyboard.

27. The method of claim 1, wherein the computer user interface device is an audio input device with which a user inputs audio information to a personal computer system.

28. The method of claim 1, wherein the computer user interface device is a video input device with which a user inputs video information to a personal computer system.

29. The method of claim 1, wherein the computer user interface device is a user output device for a personal computer system.

30. The method of claim 1, wherein the computer user interface device is a video display device with which a personal computer system outputs video information to a user.

31. The method of claim 1, wherein the computer user interface device is an audio speaker device with which a personal computer system outputs audio information to a user.

32. A method for managing a computer user interface device, the method comprising:
    establishing a wireless communication link between a computer user interface device and a first personal computer system, the computer user interface device comprising an audio input device with which a user inputs audio information to a personal computer system;
    utilizing the computer user interface device to provide a user interface between the first personal computer system and a user of the first personal computer system;
    establishing an inter-system communication link between the first personal computer system and a second system;
    communicating a predetermined signal from the computer user interface device to the first personal computer system; and
    in response to receiving the predetermined signal at the first personal computer system, communicating a hand-off signal from the first personal computer system to the second system over the inter-system communication link, the hand-off signal indicating that the computer user interface device is to be used to provide a user interface between the second system and a user of the second system instead of to provide a user interface between the first personal computer system and a user of the first personal computer system.

33. The method of claim 32, wherein the predetermined signal comprises a voice command.

* * * * *